(12) United States Patent
Lock

(10) Patent No.: US 9,087,380 B2
(45) Date of Patent: Jul. 21, 2015

(54) METHOD AND SYSTEM FOR CREATING EVENT DATA AND MAKING SAME AVAILABLE TO BE SERVED

(76) Inventor: Timothy J. Lock, Ann Arbor, MI (US)

(*) Notice: Subject to any disclaimer, the term of this patent is extended or adjusted under 35 U.S.C. 154(b) by 2044 days.

(21) Appl. No.: 10/854,624

(22) Filed: May 26, 2004

(65) Prior Publication Data

US 2005/0277466 A1    Dec. 15, 2005

(51) Int. Cl.
| | | |
|---|---|---|
| *G09B 23/28* | (2006.01) | |
| *G06K 9/20* | (2006.01) | |
| *G06K 9/46* | (2006.01) | |
| *G06T 1/00* | (2006.01) | |
| *G06T 7/00* | (2006.01) | |
| *H04N 5/222* | (2006.01) | |

(Continued)

(52) U.S. Cl.
CPC ............ *G06T 7/0044* (2013.01); *H04N 5/2226* (2013.01); *H04N 5/247* (2013.01); *H04N 5/272* (2013.01)

(58) Field of Classification Search
CPC ....... G06T 7/0044; G06T 7/20; G06T 7/2033; G06T 2207/10012; G06T 2207/10016; H04N 5/2226; H04N 5/247; H04N 5/272; G06K 9/3241; G06K 9/00771; G06K 9/00791; G06K 9/00798; G06K 9/3258; G06K 9/209; G06K 9/00201; G06K 2209/15; B60R 1/00; G08G 1/16; G08G 1/017; G08G 1/0175; G01S 17/89
USPC .......................................... 382/106, 103, 107
See application file for complete search history.

(56) References Cited

U.S. PATENT DOCUMENTS

| | | | | |
|---|---|---|---|---|
| 5,363,297 | A | | 11/1994 | Larson et al. |
| 5,469,511 | A | * | 11/1995 | Lewis et al. ...................... 434/44 |
| 5,647,016 | A | * | 7/1997 | Takeyama ...................... 382/103 |

(Continued)

OTHER PUBLICATIONS

Cavallero, R. The FoxTrax Hockey Puck Tracking System. Computer Graphics and Applications, IEEE vol. 17, Issue 2, Mar.-Apr. 1997, p. 6-12; DOI 10.1109/38.574652.*

(Continued)

*Primary Examiner* — Nikolai A Gishnock
(74) *Attorney, Agent, or Firm* — Young Basile Hanlon & MacFarlane P.C.

(57) ABSTRACT

A method and system for creating event data including 3-D data representing at least one participant in an event and making the event data available to be served is provided. The system includes a communications network. A plurality of camera units are coupled to the communications network. The camera units are configured and installed at an event venue to generate a plurality of images from waves which propagate from objects in the event and includes the at least one participant in a plurality of non-parallel detector planes spaced about the event venue. The camera units include a plurality of detectors for measuring energy in the images in the detector planes to produce a plurality of signals obtained from different directions with respect to the at least one participant and a plurality of signal processors to process the plurality of signals from the plurality of detectors with at least one control algorithm to obtain image data. A processor subsystem is coupled to the communications network to process the image data to obtain the event data including the 3-D data. A server, which includes a data engine, is in communication with the processor subsystem through the communications network. The server is configured to receive the event data including the 3-D data from the processor subsystem and to make the event data available to be served.

15 Claims, 3 Drawing Sheets

(51) Int. Cl.
*H04N 5/247* (2006.01)
*H04N 5/272* (2006.01)

(56) References Cited

U.S. PATENT DOCUMENTS

| | | | |
|---|---|---|---|
| 5,870,136 A * | 2/1999 | Fuchs et al. | 348/42 |
| 6,133,946 A * | 10/2000 | Cavallaro et al. | 348/135 |
| 6,204,813 B1 * | 3/2001 | Wadell et al. | 342/463 |
| 6,304,665 B1 * | 10/2001 | Cavallaro et al. | 382/106 |
| 6,452,598 B1 * | 9/2002 | Rafey et al. | 345/473 |
| 6,567,116 B1 | 5/2003 | Amanm et al. | |
| 6,597,406 B2 * | 7/2003 | Gloudemans et al. | 348/587 |
| 6,634,967 B2 * | 10/2003 | Daniel | 473/451 |
| 6,669,346 B2 * | 12/2003 | Metcalf | 434/44 |
| 6,683,968 B1 * | 1/2004 | Pavlovic et al. | 382/103 |
| 6,707,487 B1 * | 3/2004 | Aman et al. | 348/169 |
| 6,744,403 B2 * | 6/2004 | Milnes et al. | 342/357.07 |
| 7,623,674 B2 * | 11/2009 | Nichani et al. | 382/103 |
| 7,657,079 B2 * | 2/2010 | Lake et al. | 382/154 |
| 7,668,370 B2 * | 2/2010 | Noble et al. | 382/173 |
| 2002/0041327 A1 | 4/2002 | Hildreth et al. | |
| 2002/0051216 A1 | 5/2002 | Hudson et al. | |
| 2002/0064314 A1 * | 5/2002 | Comaniciu et al. | 382/239 |
| 2002/0105529 A1 * | 8/2002 | Bowser et al. | 345/629 |
| 2002/0122113 A1 * | 9/2002 | Foote | 348/48 |
| 2003/0012409 A1 * | 1/2003 | Overton et al. | 382/103 |
| 2003/0038892 A1 * | 2/2003 | Wang et al. | 348/461 |
| 2003/0053680 A1 * | 3/2003 | Lin et al. | 382/154 |
| 2003/0193571 A1 | 10/2003 | Schultz et al. | |
| 2004/0234136 A1 * | 11/2004 | Zhu et al. | 382/224 |
| 2006/0187305 A1 * | 8/2006 | Trivedi et al. | 348/169 |

OTHER PUBLICATIONS

Mittal A et al. M2 Tracker: A Multi-View Approach to Segmenting and Tracking People in a Cluttered Scene. International Journal of Computer Vision vol. 51(3), 189-203, 2003.*

Pérez P et al. Data Fusion for Visual Tracking With Particles. Proceedings of the IEEE, vol. 92, No. 3, Mar. 2004.*

* cited by examiner

METHOD AND SYSTEM FOR CREATING EVENT DATA AND MAKING SAME AVAILABLE TO BE SERVED

BACKGROUND OF THE INVENTION

1. Field of the Invention

This invention relates to methods and systems for creating event data and making same available to be served.

2. Background Art

Sports information and broadcasting are currently provided extensively via the Internet. Much work has been done to allow the effective streaming of video over the web. With sufficient bandwidth this can be done effectively, although many users suffer from very poor performance. Video over the web suffers from too much information, even with compression. The cost to produce video productions is reduced by the result being broadcast via the web. Streaming text is quite successful, but not very exciting to watch, and its requires an announcer to transcribe the action. There are current web sites which provide near real-time game summary statistics. However, they lack sufficient information to allow reconstruction of detailed analysis of a game.

Streaming audio is quite successful. The data rates for good performance are modest. Many non-televised sporting events (at most colleges for instance) have radio announcers.

Published U.S. Patent Applications 2002/0051216 and 2003/0193571 both disclose smart cameras. As described in the latter application, in many applications, machine vision or image processing analysis is used to inspect or locate an object. For example, in manufacturing applications, machine vision analysis may be used to detect defects in a manufactured object by acquiring images of the object and using various types of image processing algorithms to analyze the images. As an example, a system to manufacture electrical components such as capacitors may use machine vision to examine respective sides of the capacitors in order to detect manufacturing defects, ensure that the capacitors are labeled, marked, or color coded properly, etc.

Machine vision applications may use image processing software operable to perform any of various types of image analysis or image processing functions or algorithms in examining an acquired image of an object. For example, pattern matching algorithms are often used, e.g., in order to compare the pattern information of the acquired image to pattern information of a template image. Color matching algorithms may also be used, e.g., in order to compare the color information of the acquired image to the color information of a template image. Blob (Binary Large Object) analysis tools may also be used to examine an image. In various applications, pattern, color and/or Blob analysis information may be used to verify that: an object includes all necessary components in the correct locations, an object has the appropriate words, labels, or markings, an object surface is not scratched or otherwise defective, etc.

Any of type of camera or other device may be used to acquire the images to be analyzed in a machine vision application, including digital cameras, line scan cameras, etc. As used herein, the term "camera" is intended to encompass all such devices, including infrared imaging devices, x-ray imaging devices, ultra-sonic imaging devices, and any other type of device which operates to receive, generate, process, or acquire image or sensor data.

Typically, the image processing and analysis of image data is performed by a computing system which may be coupled to the camera. For example, a personal computer (PC) may receive image data from a camera and may execute one or more software programs to process and analyze the image data. As another example, a data acquisition (DAQ) computer board (e.g., installed in a computer) may receive image data from the camera and perform various signal processing operations on the data, including pattern recognition, signal conditioning and conversion, and filtering, among others.

Increasingly, however, such image processing capabilities are performed by the camera or sensor by hardware and/or software "on-board" the device. The term "smart camera" is intended to include any of various types of devices that include a camera or other image sensor and a functional unit (i.e., a processor/memory and/or programmable hardware, such as a field programmable gate array (FPGA)) capable of being configured to perform an image processing function to analyze or process an acquired image. Examples of smart cameras include: NAVSYS Corporation's GI-EYE, which generates digital image data that are automatically tagged with geo-registration meta-data to indicate the precise position and attitude of the camera when the image was taken; Vision Components' GmbH Smart Machine Vision Cameras, which integrate a high-resolution Charge Coupled Device (CCD) sensor with a fast image-processing signal processor, and provide various interfaces to allow communication with the outside world; and Visual Inspection Systems' SMART cameras with on-board DSP capabilities, including frame grabbers and robot guidance systems, among others.

SUMMARY OF THE INVENTION

An object of the present invention is to provide a method and a system for creating event data and making same available to be served wherein the event data includes 3-D data representing at least one participant in the event.

In carrying out the above object and other objects of the present invention, a system is provided for creating event data including 3-D data representing at least one participant in an event and making the event data available to be served. The system includes a communications network and a plurality of camera units coupled to the communications network. The camera units are configured and installed at an event venue to generate a plurality of images from waves which propagate from objects in the event including the at least one participant in a plurality of non-parallel detector planes spaced about the event venue. The camera units include a plurality of detectors for measuring energy in the images in the detector planes to produce a plurality of signals obtained from different directions with respect to the at least one participant and a plurality of signal processors to process the plurality of signals from the plurality of detectors with at least one control algorithm to obtain image data. The camera units are calibrated in 3-D with respect to the event venue. A processor subsystem is coupled to the communications network to process the image data to obtain the event data including the 3-D data. A server, which includes a data engine, is in communication with the processor subsystem through the communications network. The server is configured to receive the event data including the 3-D data from the processor subsystem and to make the event data available to be served.

The waves may be light signals reflected from the objects, and at least one of the detectors may comprise an array of photodetectors.

Each of the arrays of photodetectors may include a video camera.

The 3-D data may represent 3-D positions, poses and appearances of the at least one participant.

The 3-D data may represent a plurality of participants in the event and 3-D positions, poses and appearances of the participants.

The event data may include snapshots and video clips of the event, individual and group statistics, and officiating help data when the event is an officiated event.

The network may be an ethernet network or may be a wireless network.

The system may further include a client including an animation engine configured to receive the event data and to create an animated scenario including at least one animated participant in the event moving along a virtual path based on the event data.

The scenario may be a play and the at least one participant may include at least one virtual player in the play.

The at least one virtual player may include at least one virtual sports player.

The client may include an editor for editing the event data to obtain edited event data, and the animated scenario may be based on the edited event data.

The client may include means for creating a virtual environment based on the event data, and the animated scenario may be simulated in the virtual environment.

The client may include means for controlling the animated scenario in the virtual environment.

The means for controlling may control a view point of a real human viewing the animated scenario.

The server may further include a web server.

The system may further include a client including a web browser interface configured to couple the client to the web server through the web browser interface to obtain the event data for at least one selected object in the event.

The client may include an animation engine to create an animated scenario including at least one animated virtual participant moving along a virtual path based on the served event data.

The system may further include an audio subsystem coupled to the communications network. The audio subsystem may be configured and installed at the event venue to acquire and process a plurality of sounds from different locations at the event venue to obtain sound data. The processor subsystem processes the sound data to obtain 3-D sound data. The event data includes the 3-D sound data.

The event may be an action-oriented event such as a sporting event.

The event may be a surveillance event.

The calibrated camera units may produce 3-D directed line segments which represent 3-D positions as seen by a single camera unit.

Still further in carrying out the above object and other objects of the present invention, a method for creating event data including 3-D data representing at least one participant in an event and making the event data available to be served is provided. The method includes generating a plurality of images from waves which propagate from objects in the event including the at least one participant in a plurality of non-parallel detector planes spaced about an event venue. The method further includes measuring energy in the images in the detector planes to produce a plurality of signals obtained from different directions with respect to the at least one participant. The method further includes processing the plurality of signals with at least one control algorithm to obtain image data, processing the image data to obtain the event data including the 3-D data, and making the event data including the 3-D data available to be served.

The method may further include creating an animated scenario including at least one animated participant in the event moving along a virtual path based on the event data.

The method may further include editing the event data to obtain edited event data, and the animated scenario may be based on the edited event data.

The method may further include creating a virtual environment based on the event data, and the animated scenario may be simulated in the virtual environment.

The method may further include controlling the animated scenario in the virtual environment.

The step of controlling may control a view point of a real human viewing the animated scenario.

The step of making may make the event data available to be served over the Internet.

The method may further include serving the event data over the Internet.

The method may further include creating an animated scenario including at least one animated virtual participant moving along a virtual path based on the served event data.

The method may further include acquiring and processing a plurality of sounds from different locations at the event venue to obtain sound data and processing the sound data to obtain 3-D sound data. The event data may include the 3-D sound data.

The method may further include processing the 3-D data to fill in incomplete or missing information.

The method may further include utilizing 3-D data which represents position and velocity of the at least one participant with a 3-D model of the event to compensate for incomplete or missing event data.

One embodiment of the method and system allows the automatic broadcast over the Internet of sporting and other action-oriented events. The system creates a comprehensive record of the event by continuously tracking with cameras and using recognition technology to determine the location of all event participants and provides for the derivation of the information required to create animations to allow a user to view the action over the Internet. The system allows the viewer to participate in an event by letting him choose the viewing perspective and time. A viewer can view a football game from the point of view of the middle linebacker, or a soccer game from the point of view of the goalie. The information can also be used by video games to allow the blending of reality into current games.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

One embodiment of the system of the invention broadcasts action-oriented entertainment content over the web. An acquisition system acquires event information in the form of the positions and poses of participants, and view of the scene. A data engine stores it for broadcast over the Internet. A user system allows a user to select, retrieve and view the event from any position.

The acquisition system is typically installed at client venues to capture events. Current digital imaging and machine vision technology enable cost-effective installations.

The data engine serves the achievable resolution, video and sound quality, and acquisition rate to match the capabilities/expectations of the user.

The user system displays a mix of video game-like animation and video images. The capabilities developed for advanced computer games makes feasible the creation of viewable 3-D animations driven by the acquisition system.

System Components

Acquisition System

The acquisition system is a network of off-the-shelf "smart cameras" and controllers which derive the 3-D scene information and images from a limited number of camera views. A smart camera uses on-board processing to derive and communicate critical information from what it sees. Multiple smart camera outputs allow the reconstruction of movements and positions of objects to a specified resolution.

The acquisition system controllers automatically generate:
3-D positions of players and their poses;
Appearance of players in 3-D graphics description;
Snapshots and video clips of highlights and key plays;
Player and team statistics; and
Officiating help.

Installation

Figure 1:
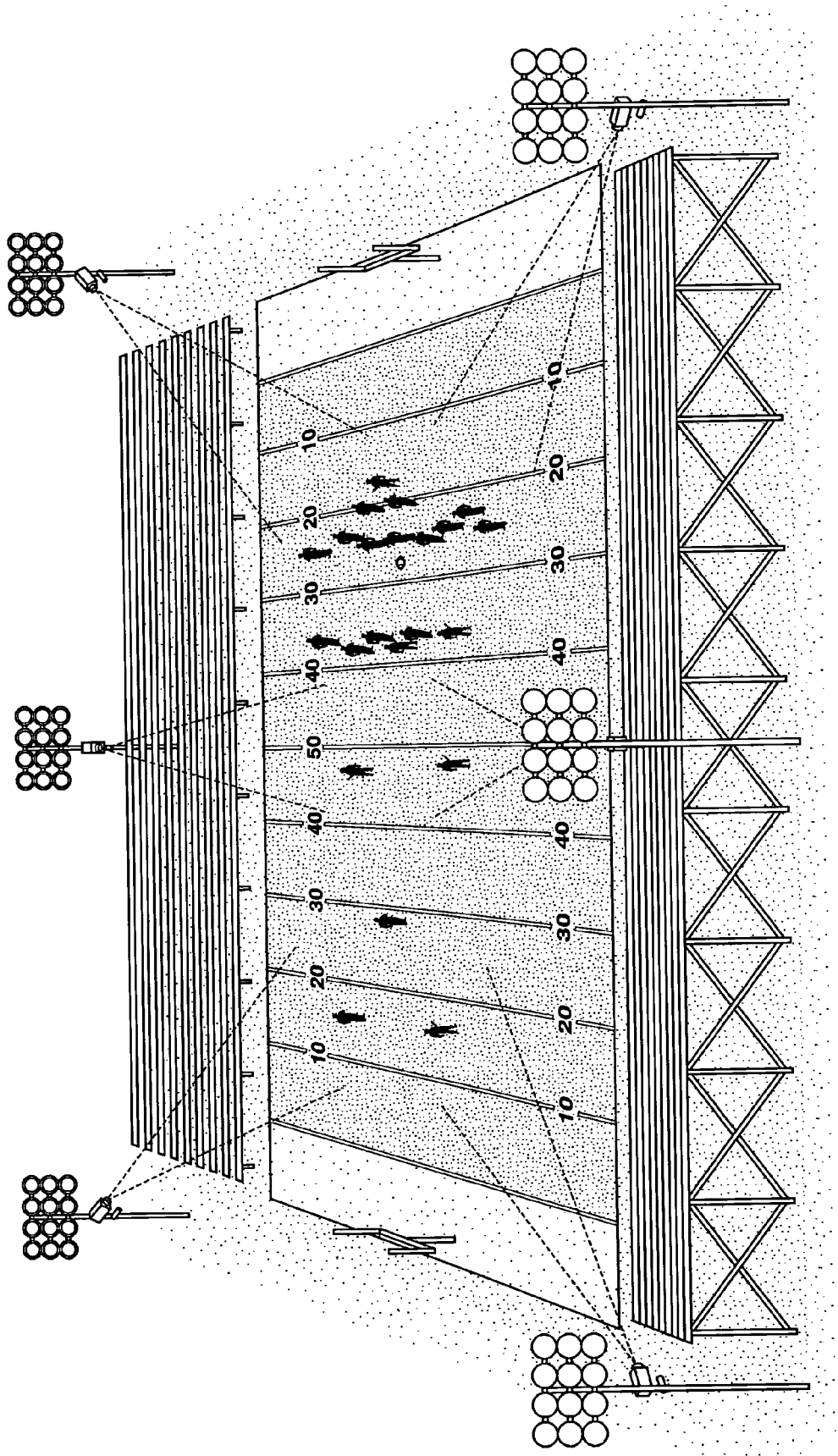
FIG. 1 is a perspective schematic view of an event venue, such as a football stadium, wherein participants in an event, such as football players playing a game of football, are viewed by a system of the present invention to create event data including 3-D data representing the football players.

Once installed, the acquisition system is passive and routine event data transmission is automatic. The smart cameras are permanently mounted on posts back from the playing field, typically light towers, as shown in FIG. 1. The acquisition system may be either permanently or temporarily installed in client venues. Web-based diagnostics would be utilized for system monitoring.

Data Engine

The data engine uses both off-the-shelf software and hardware (i.e., servers) to store and make the event data available over the web. The network bandwidth required could be licensed from the many Internet providers.

User System

The user system generates event animations on user's PCs or game systems. The user system can be used in many ways for viewing an event, analyzing the event, or as the starting point for various simulation games. The event data makes possible unlimited user selectable views of events, e.g., view a football game from the quarterback's perspective, from ten feet above and behind him, or from the sidelines. The result is a highly interactive, instructive, compelling entertainment.

There are many applications for a system of the present invention. The most compelling appears to be the unique ways to attend an event in a virtual environment or stadium.

Virtual Stadium

One embodiment of the system offers fans a virtual stadium and an all-area pass, including the playing field in the middle of the action. In addition, multiple events or multiple views of the same event can be simultaneously displayed.

The following subsections illustrate applications of different embodiments of the system.

Viewing Programs

A viewing program allows someone to watch an event and control the viewing positions along with the pace of the game.

Viewing Sports

The event data drives a 3-D animation. It allows the choice of various viewing approaches, follow a player, follow the ball, isolate on a player, along with zoom, angle, etc. It wold allow backward or forward movement in time (where possible), by play, possession or other similar concept.

Sports Games

With the addition of an interface to read and use the stored event data, the Sports Games could be used to view current and historical games. To generate their plays and graphics, these games' developers have already done a vast amount of work, which can be enhanced by the event data.

PDA/Messaging Interactive Game Data

The event data can be streamed to a PDA or cell phone with a 2-D play/view interface. A cell phone with color display and 3-D animation capability can be used to follow the game, or play a simulation game with someone else.

Simulation Games

A simulation game can use the historical event data to determine the options and outcomes of strategies or plays chosen by the players.

Sports Games

With the addition of an interface to read and use the stored event data, the Sports Games can be used to play against a chosen historical team.

Football Game

This allows, for instance, the UNIVERSITY OF MICHIGAN™ team to play THE OHIO STATE UNIVERSITY® team at any point in the season, with the outcome being determined by the current season's event data of the respective teams. This also allows a fantasy football version where the players, who are chosen for a team, would use their actual performance in the previous week or season to determine the performance of the team.

Fantasy Football

Display each player's team and do real-time updates of his performance.

Coaching and Training Tool

The event data provides tools to allow coaches to analyze the player positions and movement. A simple version of the system can be used for soccer and football at all levels as a tracking and training tool. One can mine the event data of other teams looking for team or player tendencies and capabilities.

Sports Officiating System

The system can be used for officiating. Its knowledge of the relative 3-D positions of the players and ball can be used to referee many sports. It can be used as a tool to capture information to assist officials in drawing verifiably objective conclusions, or in replacing officials entirely, especially in practice situations.

Broadcast Support

As a generator of real-time statistics and unique views, one embodiment of the system can be used to assist traditional television broadcasters.

The system could also be used to extract the event data from a set of videos of a game.

Replay Generation

The system can produce graphics for broadcast announcers use in real-time. The reconstruction of the plays and the resulting statistics are of use to broadcasters and teams. The can use these both to review the game and to mine the data for various tendencies and test different scenarios and approaches. The data can be used to provide a 3-D sound track for a broadcast event. The data can be used to support a 3D viewing system supported by some advanced television/PC combinations.

Viewing Program for Games Via TV/Radio

A broadcaster can use the event data to create an animation to provide an "event data channel" with a single produced viewing approach with commentary.

Interactive Game Data

With advanced monitors, a computer can get the game data from the web, and provide a stream of statistics or summaries on an overlay image. The user can set his preferences for the kind of information he wants. A count of the yards gained by the team after each play is possible. Alternatively, a broadcaster can provide the data.

Reality Shows

A 24/7 broadcast of a reality show locale, to complement a regular produced weekly broadcast.

Stage Plays

A stage play could be broadcast with animation and 3-D sound.

Parties

Some people may want to broadcast their parties, to allow others to be virtual participants.

Animation Creation

The PlayData system can be used to stage the action for animation and capture the 3-D description of it. The animator then edits and enhances the result into a movie or show.

Security Monitoring

One embodiment of the method and system allows the enhancement of off-the-shelf surveillance video systems to track and interpret the people and objects in view. An event data description of a person might be paired with a biometric recognition system. Cars and people could all be tracked with the biometric data created. This may be paired with a behavior analysis capability. This would, for instance, monitor people in a mall parking lot, and notice when a person, rather than going into the mall, instead goes from car-to-car.

System Components

Acquisition System (High Performance)

Camera Subsystem

Figure 2:
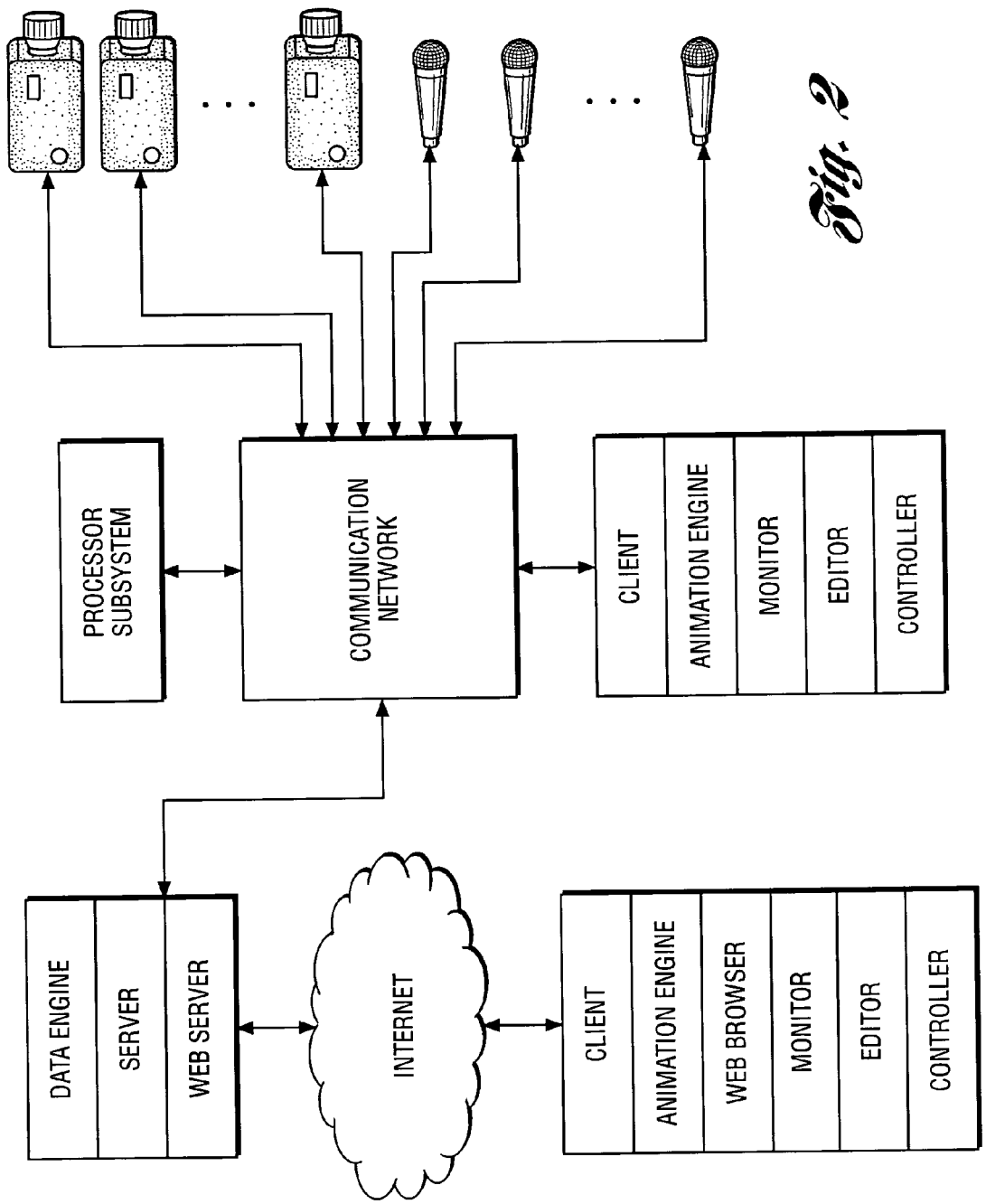
FIG. 2 is a schematic block diagram of one embodiment of a system of the present invention.

This is a network of cameras, as shown in FIG. 2, which can capture scene information both of pose and image. The camera subsystem is a family of smart cameras. The subsystem has an open interface to allow third party development of new camera systems.

Smart Camera Unit

The cameras typically comprise a processor along with some number of image heads. This will allow a single "camera" to, for instance, cover a variety of ranges or cover a wide field easily, by using multiple independently aimed sensors. Standard acquisition sensors are square, while in many cases the scene is primarily horizontal. The cameras may support 1-Gigabit Ethernet Links. The camera unit may have a zoom lens and/or the ability to pan/tilt.

The major camera components are available off-the-shelf.

Camera Processor

The processor in each camera unit is supplemented by a DSP or gate array. These provide the required hardware boost to allow the algorithms to run in real-time. Hardware and development software allows the use of a variety of off-the-shelf cameras. The processor module supports Ethernet along with up to eight image heads. The interface to the camera heads is preferably firewire, a standard high-speed interface, which will allow many different cameras to be used if desired.

Camera Image Head

The camera head, which feeds the image data to the camera processor, includes a 1 to 16 Megapixel RGB imager. The camera image head has its own processor to control initial image acquisition and processing. The camera head uses a firewire interface to stream the image data to the camera processor. A low cost version of the camera unit combines the image head with a single processor for less demanding applications.

Sound Subsystem

A network of microphone units captures the sound in various areas, as shown in FIG. 1. The sound is analyzed and stored to allow 3-D positional specific sound. The sound subsystem is a family of microphone units and an interface to allow third party development of sound acquisition system components.

Each microphone unit is preferably directional to allow the sound from one region of the scene to be captured and sent to the network processor or subsystem.

Integration and Analysis Subsystem

The integration and analysis subsystem (the subsystem of FIG. 2) creates and maintains a description of the scene at a specified resolution. It provides this data to the data engine.

The analysis and integration subsystem contains a processor with DSPs or gate arrays to collect and process the data from the individual camera units and microphone units and transfers it to the local data engine of the server. The link to the local data engine may be either 1-Gigabit Ethernet or firewire. This hardware, and the software required to use it, is available off-the-shelf.

Network

A 1-Gigabit Ethernet network may connect all the system components for good performance. A wireless network could also be used with some sacrifice of performance.

Miscellaneous Hardware

All of the above-noted equipment typically needs mounting hardware, environmental enclosures and cabling.

Acquisition System Operation

Acquisition Description

The acquisition system derives the 3-D game information and images from a limited number of 2-D views. Several views of each "player" or event allow the reconstruction of all the movements and positions. Some advantages with many sports are the use of uniforms with numbers and the reset of the game frequently to known positions.

The network of camera units view the scene (i.e., the event venue) from various angles. At least two different views of any object in the scene are desirable. The cameras may have a pixel resolution of, for instance, 1,000 by 1,000 pixels. At a given distance, the camera views some field of view, dependent on its lens, for instance 10 m×10 m at 40 m distant. In this case, the resulting acquisition resolution at 40 m would be 10 m/1,000 pixels or approximately 1 m/100 pixels or 10 mm/pixel (approximately ½ inch).

The typical rate for broadcast video is currently 30 frames/second. A rate of data acquisition of 10 updates/second would allow a viewer to follow the game. Selected cameras could have faster update rates, for instance a ball-tracking camera. The broadcast video rate is a rate at which a person can perceive a sequence of images as smooth motion The graphics system the user is viewing would be updating the view at least 30 frames/second, but the positional data rate does not have to match this, since the animation software will produce smooth motion for all objects. Many types of inference are necessary for the system to work properly.

An animation of a group of players in a sport typically rests on a model for players with adjustments for factors such as height, weight, appearance and proportions. A model of this type is a mathematical description of the object, with a set of parameters which determine what pose the player is in. The acquisition system derives these parameters. This set of parameters is a very compact, efficient way to describe a player, particularly since only the parameters which are changing need to be exchanged with the animation engine. An additional aspect of the model is a dynamic description of the objects.

Scene Occlusion

At times, various players may be occluded from the view of all cameras, or a scene may be too busy or complex to be able to identify all the players at a given time. If the data is broadcast with a several second delay, previous or subsequent information can be used to fill-in the missing data. Missing information is filled in using various consistency rules until later information becomes available—primarily that previous motion continues.

Scene Description

A scene is modeled as having a static background, dynamic background elements, and foreground objects (players). An object could be a simple 3-D solid, or could have a much more complicated description such as an abstraction of a human body. The object has both static and dynamic attributes. Its height and weight and overall form are static throughout a given scene. The way a certain person walks and runs can also be determined and used to reduce the amount of information for a realistic animation.

Pose

An object has an overall position (its center of mass) and also a yaw, pitch and roll. This entire description is called its pose. If the object is composed of multiple rigid parts, such as head, hands, legs, feet, then to describe the object one needs to describe the pose of each of the parts. However, all these poses are related to each other. Every pose does not change every time one looks.

There are many effective strategies to describe a sequence of motions with a minimum of data. These would be employed to describe the motions of objects under the scene conditions in an efficient way.

View

For an object at a given position, there are a multiplicity of views. These depend on the perspective chosen and the lighting, among other things. A view as captured by a camera can be compressed somewhat, but it requires an unbroken high-resolution sequence at a fairly high rate, to produce the illusion of actually watching an event. A PC or video game is currently very good, and continually getting better, at generating images which produce this illusion.

Gesture

Another strategy to reduce the size of the description is to describe gestures. For instance, walking, running or waving can all be described as gestures of a given object, starting at A and going to B at some rate. This description requires far less data to describe, and vastly less than a video of the object moving. In addition, default gestures can be specified such as: keep going, or stop and return to C, if no further information is provided about the object.

Position/Gesture Description

If one knows the position of objects, and the background and lighting conditions, one can generate any view of the scene. The position/gesture description is universal. It is also an extremely efficient method of describing the scene, and can then be used to generate a realistic view for a user.

Image Additions

With a position/gesture description, then at the time the position/gesture information is acquired, one can also extract image details. When the gesture is derived, the boundary of a given sub-object (a shoe or hand) is also derived. Both the image extracted, along with the acquiring view can be stored.

To create an animation at a chosen view, the image can be transformed by using the knowledge of the acquiring view and the chosen view. It can be used to add detail to the graphic images created for the user view. So, for instance, by occasionally sending the description of a shoe, the user would see the grass stains on it, while the data sent is still quite small and occasional.

This would include capturing actual scenes of particular interest such as catches, fumbles and out-of-bounds situations. These scenes would be transformed to match the current viewing position chosen.

Creation of Image Data

The derivation of the 3-D positions and view-independent appearance of the participants extracts the following information from the images acquired by each camera unit:

Participant number (if used);
Head/helmet position;
Center of mass of body/chest/back;
Hands/arms/elbows/shoulders;
Feet/legs knees.

Figure 3:
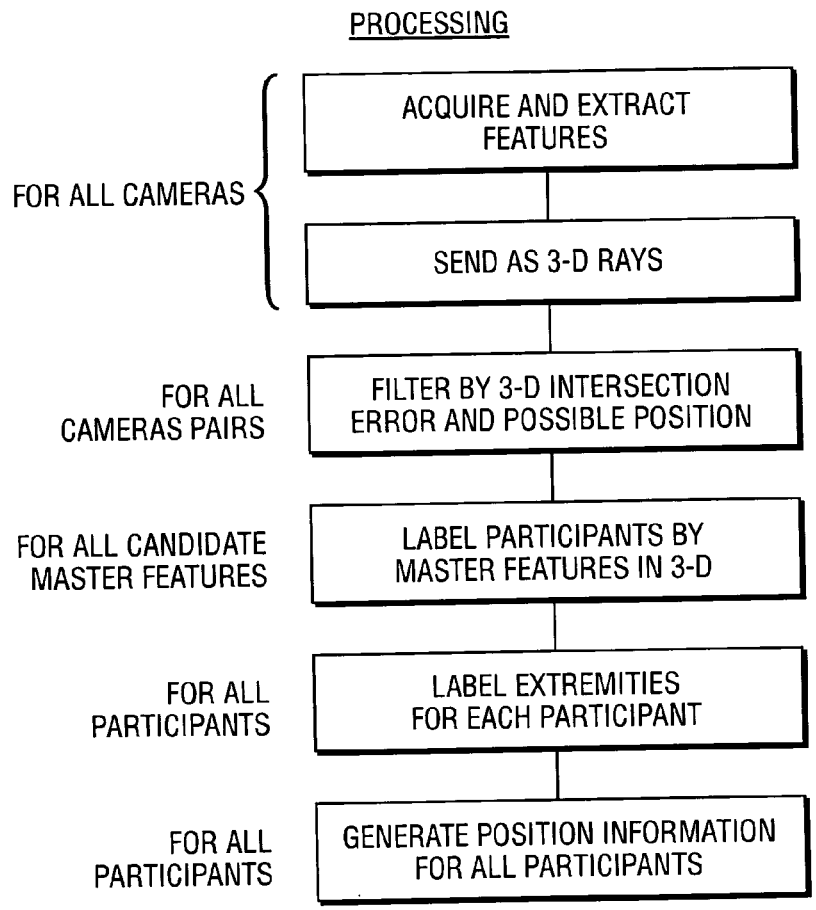
FIG. 3 is a block diagram flow chart which illustrates one embodiment of a method of the present invention.

The data extraction proceeds in the following manner, as shown in FIG. 3:

Image acquisition (for each camera);
Image segmentation (for each camera);
Feature intersection and labeling (on features from all cameras);
Choose best labeling given previous information;
Extract and update appearance information;
Compute and store current data.

Camera-Based Processing

The acquisition of images and the first stage of the processing typically take place in the "smart camera," or camera unit.

The data used by the camera to derive this information is:

Calibration parameters, relating the camera 3-D position to the event field or venue;
Previous positions and velocities of objects in view;
Information about the type of event.

If no previous information is available, then the operations will proceed using a set of startup parameters.

Image Acquisition

The image acquisition would be in parallel with the information about the previous state of the scene available. Previous scene information would be used to target the potential areas to acquire images from. It would also be used to adjust the acquisition parameters for an optimal image. The images acquired are saved until the next images are acquired.

Image Segmentation

The images are segmented in parallel using previous information to help the image segmentation be as reliable and fast as possible. If known, the approximate position and appearance of features would be used to simplify and speed up this process.

The participants' features are extracted from background via image segmentation with blob analysis, edge analysis, region growing, or other typical image processing techniques.

Information about the velocity of objects may be gained by subtracting the new image from a previous image.

Various object extraction operations would be used to isolate necessary features in a consistent way. Extremities are especially important, so a set of extremity extraction operations would be used.

Features would be assigned a type depending on the extraction operation which produces them. Generally similar types of features are produced by similar extraction operations.

The registration marks on the field would be extracted and available for updating the calibration data as needed.

Send 1st Stage Results

The above information is in image coordinates, tied to a specific camera. The image features are transformed into 3-D features by using the camera calibration data. The 3-D image features are sent to the processor for labeling. A point feature would become a 3-D ray from the camera center, for instance.

2nd Stage Processing

When the feature are labeled, then the results are sent back to the cameras and can be used to go back into the images and extract any updates to the object appearance model, or to derive more information to remove ambiguities in the labeling.

Send 2nd Stage Results

When complete, any results are sent for further processing and storage.

1. Integration and Analysis Processor

The segmentation results are passed to the feature processor. This system combines all the information from the individual cameras and creates the labeled 3-D positional information. It sends the results back to the cameras to guide the next acquisition and segmentation cycle, which also allows the images to be examined for necessary updates to the player appearance and possibly additional feature information.

The processor would have event information sufficient to allow it to determine the starting participants and their positions.

2. Feature Intersection and Labeling

The task of labeling has two components: the participant location and the location of their extremities.

The labeling proceeds in the same manner in both cases, with the difference being that the entire field is scanned for all participants, whereas once they are known, the possible positions of their extremities are known fairly accurately. In addition, algorithms would be used which would "grow" the extremities from the master feature, observing various rules about the human form (head opposite legs, arms attached to trunk, etc.). The goal is to reduce the amount of ambiguous information which has to be exhaustively searched for consistency.

3. Participant Labels

A master feature would be matched first, using the center of mass of a large feature which would correspond to each player. Extremities of objects would be resolved only after their owner was known. Whenever a player number can be unambiguously extracted, recognized and matched to a master feature, it would be used as a label.

The initial step is to find the 3-D positions of the participants from the sets of features in each camera. Each camera feature represents a ray from the camera center through the actual feature. The rays from all the cameras, which describe the same 3-D feature, should all intersect with some small error in the 3-D position of the feature.

3.1 Extremities Labels

Once the participants are labeled and their positions known, then their extremities are labeled using the same labeling technique, restricting the candidate features to those of the correct type and position. In addition, the extremities can be derived by establishing their connectivity to the participant.

3.2 General Labeling Approach

The general labeling approach is as follows.

4. Easy Labeling

The first step is to take pairs of cameras and find all unambiguous labelings. This is then extended to all cameras, with the result being a labeling of easy features. Then a labeling of the remaining features is performed which makes inferences as necessary.

4.1 Recursive Labeling with Acquisition

The basic approach is to recursively evaluate all possible valid feature pairings using several filters to limit the possibilities. The filters used would be:

5. Intersection Filter

Figure 4:
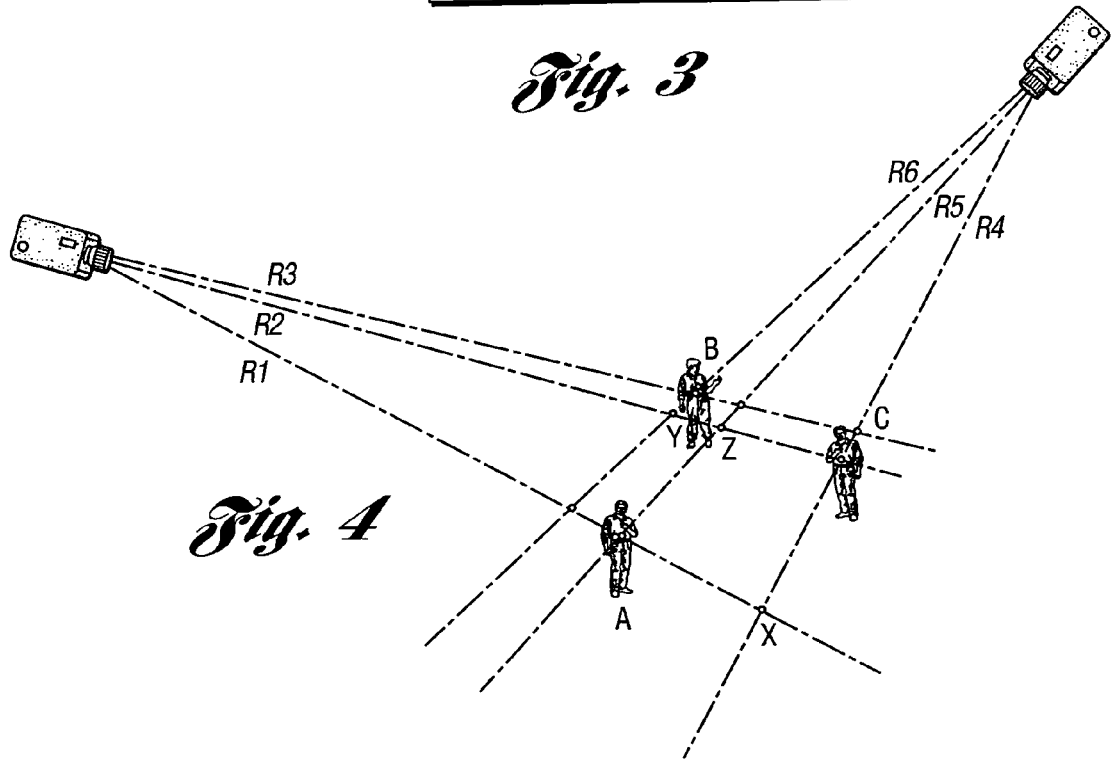
FIG. 4 is a schematic diagram of a pair of cameras and directed line segments from the camera centers to the participants in an event.

This would be used to evaluate pairs of features between cameras for compatibility by intersecting rays from features of the same type and eliminating pairs which have large intersection errors and/or do not end up in a physically possible plane. This filter dramatically reduces the set of possible features, which could correspond to the same object. FIG. 4 illustrates an example of this filter. For example, positions A, B, and C have previous positions A', B' and C' wherein maximum movement possible is about 2 meters. The height of R1 at A is 2 meters, at X is 1.5 meters. The height of R4 at C is 2 meters, at X is 1.2 meters. The intersection error at X is 0.3 meters at A. The error for the intersection of R1,R5 at A is 0.005 meters. The intersection of R1,R4 at X is 0.300 meters. The intersection filter removes x from consideration if error is set to 0.050 meters. The intersection of R2,R5 at Z has an error of 0.04 meters, so it is a valid candidate. The result of the intersection filter is to leave A, B, C, Z as candidates. Additional camera pairs will produce A, B, C, but not Z. The minimum error from the previous positions is used to label the resulting candidates.

5.1 3-D Proximity

An object can only have moved so much in the amount of time indicated, so candidate features from each camera which pass close to the previous position are only considered for that object's label.

5.2 Recursive Match

After the filtering, there is a recursive match testing all possible combinations of the remaining unlabeled features. Each combination is evaluated by finding the minimum distance from the previous positions. A combination is rejected as soon as there are not enough valid candidates or an error threshold is exceeded.

3.3 Missing or New Features

The largest set of consistent features with minimal error below a threshold is found. This may leave some unmatched features. These are then given an attribute "new" and assigned provisional labels based on consistency with previous feature information. There may also be previous features which are not matched to any current features. These features are given the attribute "missing".

At this step, the previous feature information can be used to guess the correct labeling for new or missing features. However, the information that it is a guess is included to allow later processing to override this information.

3.4 Conclusion

When this process is complete, the resulting features from all camera pairs are combined into a complete description of the scene. This description of the scene is then used to update the current model of the event.

Data Model Construction

This data can then be compressed and served in its entirety, or a description of necessary changes can be made, compressed and served. In addition, a higher level description can be generated which describes the abstraction of the event: participant overall position movement, with pose or gesture change description.

Sound Analysis

The processor isolates the sounds local to a sub-region of the event. This is stored in this form.

Data Engine

The data engine stores and makes the data available to be served over the web or locally.

Position Storage

Storage for a sequence of positions and poses for all objects in the scene tagged by time.

Graphic Object Storage

Storage for graphic details tied to individual players. These may be kept throughout a season.

Video Matrix Storage

Storage for images tagged for time and place.

Sound Matrix Storage

Storage for sound tagged for time and place. Stores both audio and text information.

User View Generation

Generates data to serve a user application.

Web View Generation

Generates data to serve the standard 3-D animation system currently available for browsers.

Broadcaster View Generation

Source image generation for use by broadcasters or teams. Utilizes video overlay generation hardware as needed.

Data Interface

The data interface is available to allow third party software to be used to pre- or post-process the event data.

Network Monitoring Control Room

A control room may be maintained which would monitor the data flows and respond to system alerts and problems. Internet service providers would handle most Internet issues.

Provider

The event data may be streamed to Internet servers provided by a commercial service. There would be a cost per transaction by the service. Encryption of the data may be necessary to restrict its use to licensed computers.

User System

Event data can be used in many ways for viewing an event, analyzing the event or as the starting point for various simulation games.

Current computer graphics techniques can be used to take a series of positions information and image details (faces of players, appearance of a catch) and transform them to present them in the perspective chosen by the person viewing the program).

Event Data Source Connection

Secure login to the event data source. This allows both the control of the data, and the identification of the user, of great interest to advertisers.

View Selection

The user selects the view mode, resolution, etc. for a specific session.

Image Generation

The images are generated in the selected viewing mode.

Generation of Sound

The generation of the selected sounds would utilize the 3-D position choice to take advantage of 3-D sound systems. There are many sound systems, which recreate 3-D sound accurately.

Capabilities of Viewer

View chosen viewing positions (i.e., view plays from middle linebacker position);
Replay with arbitrary perspective;
Provide schematic view of play (X's and O's);
Generate various statistics during a game;
Track a specific player;
Fast-forward through a historical game; and
Allow user suggested modifications with different outcomes.

Animation

The user system includes a 3-D animation application, which would display the data. The user system allows control of the view and unfolding of the scene.

Viewer Description

When a view selects a perspective view of the game, the 3-D game information is used to construct a graphic representation of the players in their correct positions. In addition, selected additional images can be transformed and placed in the correct relationship by the graphic system. For instance, several reference images of a face can be used to put a face on a graphic of a player, or to transform a shot of a sideline catch for the current viewing angle and distance.

Enhanced TV Broadcast

The system of the invention may merge with the current broadcasting of sports. The acquisition system enhances the ability of broadcasters to generate replays and show plays in schematic form, and the ability of viewers to choose their perspectives of the game.

Micro-Broadcasting

A workstation capable of the generation of high quality animations could be used to create a television broadcast signal. Commentary and the choice of perspective would be in the control of the broadcaster.

SDK

Another aspect of the user system would be an SDK (Software Development Kit), which would allow game and application developers to utilize the event data or information.

Games

A family of games may be developed to capitalize on the event data.

Play Interpretation

Various additional information is needed, such as interpreting the referee's signals, a block vs. a collision, a tackle vs. a broken tackle, a pass glancing off hands vs. a catch. Working backward from a known outcome, missing information may be derived. The end of a play would allow time for this to occur.

The officials are monitored at all times, along with any statistical information available at a stadium, so any mistake is corrected. A camera may view the scoreboard to ensure consistent game information. A microphone may capture sounds of the announcer at the stadium.

Illusion

An additional aid in this process and the creation of the illusion of watching the game "live," is the ability of the viewing program to have players move smoothly between points. If data were incomplete, a player could continue their motion, and if later information indicated they were out of position, they would be "directed" to the position smoothly.

Amount of Data

The amount of data needed to represent the game is quite small, and the rate at which it is generated is slow enough to support "dial-up" Internet connections for real-time game broadcast. The amount of detail can be "scaled" to the bandwidth of the connection in use.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for the efficient capture, analysis, tracking and presentation of event data, the method comprising:
   a) providing a plurality of camera units at predetermined positions relative to an event, each of the camera units having an associated field of view of the event, the plurality of camera units being calibrated in 3-D with respect to a venue for the event;
   b) generating from the camera units a set of image projections of a dynamic object in the event as image data, wherein the dynamic object is a participant at the event;
   c) processing the image data from step b) with image segmentation to extract image features of the dynamic object in the event;
   d) transforming the image features from step c) into 3-D features using the 3-D calibration of the camera units;
   e) intersecting the 3-D features from step d) to create 3-D candidate object feature data, the 3-D candidate object feature data describing a position, a pose, and an appearance of the dynamic object in the event, wherein the dynamic object includes a plurality of rigid parts, the rigid parts including the head, hands, legs, and feet of the participant at the event, wherein the pose of the dynamic object includes a description of a yaw, a pitch, and a roll of the dynamic object, and wherein the pose of the dynamic object includes a pose of each of the rigid parts of the dynamic object;
   f) removing any of the 3-D candidate object feature data from step e) having at least one of an intersection error greater than a predetermined 3-D distance and an impossible 3-D position, wherein the 3-D candidate object feature data not having at least one of the intersection error greater than a predetermined 3-D distance and an impossible 3-D position is validated 3-D feature data;
   g) applying known physical laws and forces to compute additional 3-D candidate object feature data including the position, the pose, and the appearance of the dynamic object in the event when the dynamic object is missing from the view of all of the camera units, wherein the computed additional 3-D candidate object feature data includes the pose of each of the rigid parts of the dynamic object when the dynamic object is missing from the view of all of the camera units, wherein previous or subsequent 3-D candidate object feature data can be used to fill-in the pose of each of the rigid parts of the dynamic object as the computed additional 3-D candidate object feature data using consistency rules and the known physical laws and forces when the dynamic object is missing from the view of all of the camera units, wherein the computed additional 3-D candidate object feature data is included in the validated 3-D feature data;
   h) acquiring and processing a plurality of sounds from different locations at the event venue to obtain sound data;
   i) processing the sound data from step h) to obtain 3-D positional sound data;
   j) combining the validated 3-D feature data from steps f) and g) and the 3-D positional sound data from step i) into a description of the event to generate an event model for presentation to a client; and
   k) permitting a user of the event model to select any view point within the event model for experiencing the event through the client, the user viewing and hearing the event from the selected view point.

2. The method according to claim 1 wherein the image projections represent light signals reflected from the background and the dynamic objects.

3. The method according to claim 1 wherein the event is an officiated event and wherein the event model includes officiating help data.

4. The method according to claim 1 further comprising creating an animated scenario including at least one animated participant in the event moving along a virtual path based on the event model.

5. The method according to claim 4 further comprising creating a virtual environment based on the event model and wherein the animated scenario is simulated in the virtual environment.

6. The method according to claim 5 further comprising controlling the animated scenario in the virtual environment by controlling the view point of the user viewing the animated scenario.

7. The method according to claim 1 further comprising serving the event model over the Internet.

8. A stereo camera system for the efficient capture, analysis, tracking and presentation of event data, the system comprising:
   a communications network;
   a plurality of camera units coupled to said communications network and located at predetermined positions relative to an event, each of said camera units having an associated field of view of the event, said plurality of camera units being calibrated in 3-D with respect to a venue of the event, and generating from said camera units a set of image projections of a dynamic object in the event as image data, wherein the dynamic object is a participant at the event;
   an audio subsystem coupled to said communications network, said audio subsystem being configured and installed at the event venue to acquire and process a plurality of sounds from different locations at the event venue to obtain sound data wherein said processor subsystem processes the sound data to obtain 3-D positional sound data;
   a processor subsystem coupled to said communications network to process the image data with image segmentation to extract image features of the dynamic object in the event, to transform the image features into 3-D features using the 3-D calibration of said camera units, intersect the 3-D features creating 3-D candidate object feature data describing a position, a pose, and an appearance of the dynamic object in the event, wherein the dynamic object includes a plurality of rigid parts, the rigid parts including the head, hands, legs, and feet of the participant at the event, wherein the pose of the dynamic object includes a description of a yaw, a pitch, and a roll of the dynamic object, and wherein the pose of the dynamic object includes a pose of each of the rigid parts of the dynamic object, remove any of the 3-D candidate object feature data having at least one of an intersection error greater than a predetermined 3-D distance and an impossible 3-D position, wherein the 3-D candidate object feature data not having at least one of the intersection error greater than a predetermined 3-D distance and an impossible 3-D position is validated 3-D feature data, apply known physical laws and forces to compute additional 3-D candidate object feature data including the position, the pose, and the appearance of the dynamic object in the event when the dynamic object is missing from the view of all of the camera units, wherein the computed additional 3-D candidate object feature data includes the pose of each of the rigid parts of the dynamic object when the dynamic object is missing from the view of all of the camera units, wherein previous or subsequent 3-D candidate object feature data can be used to fill-in the pose of each of the rigid parts of the dynamic object as the computed additional 3-D candidate object feature data using consistency rules and the known physical laws and forces when the dynamic object is missing from the view of all of the camera units, wherein the computed additional 3-D candidate object feature data is included in the validated 3-D feature data, combine the validated 3-D feature data and the 3-D positional sound data into a description of the event to generate an event model for presentation to a client, and permit a user of the event model to select any view point within the event model for experiencing the event through the client; and a server including a data engine, said server being in communication with said processor subsystem through said communications network, said server being configured to receive the event model from said processor subsystem and to make the event model available to be served to a client for viewing and listening by the user from the selected view point.

9. The system according to claim 8 wherein the image projections represent light signals reflected from the background and the dynamic object.

10. The system according to claim 8 wherein the event is an officiated event and wherein the event data includes officiating help data.

11. The system according to claim 8 wherein the communications network includes at least one of an ethernet network and a wireless network.

12. The system according to claim 8 further comprising an animation engine configured to receive the event model and to create an animated scenario including at least one animated participant in the event moving along a virtual path based on the event model.

13. The system according to claim 12 including means for creating a virtual environment based on the event model and wherein the animated scenario is simulated in the virtual environment.

14. The system according to claim 13 wherein said animation engine controls the selected view point of the user viewing the animated scenario.

15. The system according to claim 9 wherein said server further includes a web server.

* * * * *